United States Patent

[11] 3,602,687

[72] Inventor Robert E. Pollock
Hilliard, Ohio
[21] Appl. No. 835,327
[22] Filed June 23, 1969
[45] Patented Aug. 31, 1971
[73] Assignee The Battelle Development Corporation
Columbus, Ohio

[54] ARC LENGTH CONTROL
16 Claims, 6 Drawing Figs.
[52] U.S. Cl............................................. 219/130,
219/131, 219/137
[51] Int. Cl......................................... B23k 9/00
[50] Field of Search............................ 219/130,
131, 131 F, 137

[56] References Cited
UNITED STATES PATENTS
2,994,763 8/1961 Schultz........................ 219/123
3,209,121 9/1965 Manz........................... 219/130
3,233,076 2/1966 Vilkas.......................... 219/131

Primary Examiner—J. V. Truhe
Assistant Examiner—C. L. Albritton
Attorney—Gray, Mase and Dunson ABSTRACT: In automatic arc welding systems where a consumable electrode wire is continuously fed to a weld zone through a holder, the holder serving to provide an electric current path to the weld electrode, the arc length and position is maintained by sensing means that sense preselected spaced areas along the arc path preferably near its extremities and means responsive to one of the sensing means failure to sense the presence of the arc appropriately alters one or more of the arc parameters to restore it to the view of the sensor.

ARC LENGTH CONTROL

BACKGROUND

This invention relates to improvements in automatic consumable electrode welding systems and relates in particular to new and novel sensing means that sense the length of the arc rather than its intensity.

Automatic electric arc welding devices are dependent to a great extent on the control systems employed to regulate the consistency and uniformity by which a weld deposit is effected. Where a consumable wire electrode is continuously fed through a holder onto or into a weld zone usually consisting of abutting plates (which may or may not be machined to form a depression to receive the weld metal) it is generally possible to adjust the amperage, voltage, electrode feed rate, and speed at which the holder (and wire) pass over the weld zone so that the electrode wire is consumed at a regular rate and assuming the workpieces to be perfectly flat and smooth so that the spacing between the electrode current path (usually from the holder) and the workpiece is uniform the arc will be stable and uniform and a desirable uniform weld will be obtained. Unfortunately the assumption on which the aforementioned statement is made is seldom the case. In actuality it is impractical in production runs to obtain perfectly flat workpieces both from a standpoint of desired welded shapes and the fact that even flat shapes are seldom perfectly flat. Also the heat of any welding operation can cause the weld pieces to warp.

Where the distance between the workpiece and the electrode contact is reduced or increased the length of the arc remains the same because the welding machine automatically maintains a constant voltage by appropriately increasing or decreasing the amperage. The effect is to lengthen or shorten the length of the electrode from its point of current contact reducing or increasing current resistance and raising or lowering the amperage. An increased amperage effects too great a penetration of the weld area while a decreased amperage effects too little penetration of the weld area. The result is that the weld is uneven unless an arc adjustment or control system is employed.

Prior known arc control systems generally consist of one or more sensing devices trained on the arc and designed to detect variations in the intensity of the arc. Means responsive to these devices alter the arc parameters in a manner to correct the deviations. The difficulties experienced with devices of this type are that the changes in arc intensity are too subtle for accurate detection; the arc varies in intensity in accordance with the area being observed and it is difficult to maintain the sensing device trained on a specific portion of an arc particularly when the arc is moving; and the measurable changes in arc light intensity are difficult to translate into corrective measures rapidly enough to avoid undesirably uneven weld deposits.

I have now found that a more accurate measurement of arc changes is the arc position rather than its intensity and that such changes may be translated into corrective measures far more rapidly and effectively than has been possibly with prior known devices. In my method and apparatus arc sensors watch preselected spaced areas along he arc itself and when one of the sensors fails to detect the presence of the arc immediate corrective measures prevent uneven welding to an extent not heretofore possible.

I have further found that my apparatus and method may be advantageously employed to control arc penetration in narrow gap welding procedures. In this type of welding plates or workpieces are positioned adjacent one another but a space or gap is left therebetween. The consumable electrode is continuously passed into the gap where the arc effects fusion and welding. Variations particularly in gap width causes the arc to either overpenetrate or underpenetrate the gap effecting uneven welding.

I direct my arc length sensing means into the gap to define a preselected arc position (penetration) and cause the sensing means to remain spaced from the gap while traveling over it. By this procedure when one of the sensing means fails to detect the presence of the arc it means that the arc has over or under penetrated. Corrective measures are immediate.

In a preferred embodiment of my invention an arc-corrective measure consists of raising or lowering the electrode holder which in effect increases or decreases the electric current path to the electrode and increases or decreases arc penetration.

Other effective means of controlling arc penetration include varying the speed at which the electrode or electrode holder passes over the weld zone and varying the consumable electrode feed rate.

THE DRAWINGS

Figure 1:
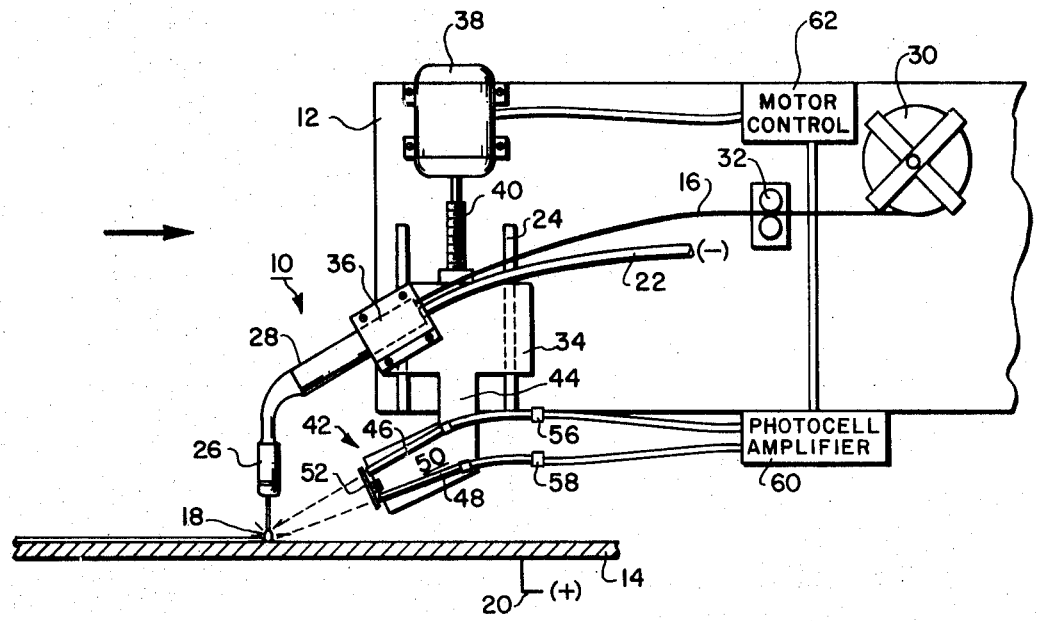
FIG. 1 is a side elevation view of an apparatus constructed in accordance with the present invention for proximity arc control.

In the apparatus of FIG. 1 a vertically moveable electrode holder assembly 10 mounted to a horizontally moveable frame 12 is positioned to guide a continuously advancing wire electrode 16 onto a workpiece 14. An opposing electrical potential (AC or DC) is established between workpiece 14 and electrode 16 to effect arc 18 by means of an appropriate electrical connection 20 to workpiece 14 and conduit 22 having an electrical conducting path leading to a metal tube 23 (usually constructed of copper) mounted in the head portion 26 of the electrode holder 28. Tube 23 has sliding electrical contact with the consumable wire electrode 16.

The consumable wire electrode 16 is fed continuously to the holder assembly 10 and arc 18 (where it is consumed) from wire reel 30 by means of drive rollers 32.

Electrode holder assembly 10 is composed of a carriage 34 that is slidably attached to frame 12 through vertically spaced guide rods 24 formed in (or attached to) frame 12 which extend through and dovetail with appropriate slots (not shown) in carriage 34.

Electrode holder 28 is attached to a carriage 34 by an appropriately bolted flange plate 36. Vertical movement or position of carriage 34 and thus holder 28 is controlled by a reversible drive motor 38 bolted to frame 12 and positioned above carriage 34. Motor 38 is positioned to drive a vertically extending drive screw or worm 40 which extends through an appropriately threaded bore (not shown) in carriage 34. Thus, assembly 10 is raised or lowered in accordance with the direction and speed of rotation of the drive screw 40 by motor 38.

As in conventional continuous and automatic welding of this type the speed at which rollers 32 advance wire 16 to the arc 18 is synchronized with the current and other welding parameters to maintain the arc at preselected intensity or length while being continuously consumed. A constant potential welding machine provides a constant voltage regardless of fluctuations in current flow. If the spacing between the workpiece and the tube 23 (electrical contract point) remains constant during horizontal travel of the overall assembly the weld deposit is consistent and no need for the present invention exists. However, in answer to the practical problems arising during automatic welding procedure wherein the space between the workpiece 14 and contact 23 varies (see FIG. 1) I provide sensing means 42 which through proper response by motor 38 maintains a relatively consistent and uniform weld bead.

In the embodiment of FIG. 1 sensing means 42 is attached to carriage 34 so as to vertically (as well as horizontally) follow carriage 34 (and thus holder assembly 10) by means of depending arm 44. Sensing means 42 itself consists of optics 46 and 48 (light guide tubes) attached to a support plate 50 and oriented to receive and guide arc light from two spaced points 46a and 48a along the length of arc 18 preferably near each end of the arc. Such orientation may, of course, be preselected or may be established after the arc is struck. A filter or optic 52 may be positioned in front of optic or light guide tubes 46 and 48. Light from optics 46 and 48 is conducted to photoelectric cells 56 and 58 respectively which, through an appropriate photo cell amplifier 60, maintains electric current flow disposed hold relays or switches open in a motor control system 62 which, if closed, would cause motor 38 to rotate drive screw 40 in a manner to lower or raise assembly 10 respectively.

Figure 3:
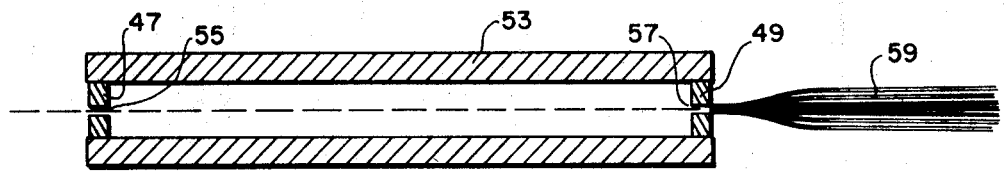
FIG. 3 is an enlarged fragmented side view partially in cross section of one of the optics of the apparatus of FIG. 1.

Optics 46 and 48 are identical, a representative cross-sectional view being shown by FIG. 3. In this preferred sensing device masking plates 47 and 49 mounted in opposing ends of a metal tube 51 are formed with aligned slits 55 and 57. Tube 51 attached to carriage 50 is aligned so that the area 46a or 48a is clearly visible through slit 57 by way of slit 55. To be sure the visible light in slit 57 is detected by the appropriate photo cell 56 or 58 a bundle of fiber optics 59 is positioned and split so that many of the fiber ends cover the open end of slit 57 and convey all possible light coming through the slit to the appropriate photocell at the terminal end of the fibers. This type of optic has proved to be particularly useful for sensing a very small area along an arc and consequently is a preferred embodiment of the present invention.

In operation, if a stable arc 18 has been established and the overall apparatus is moving in the direction of the arrow so that a weld bead is being deposited on workpiece 14 (abutting joint, etc.) as long as cells 56 and 58 see arc light the relays in motor control 62 will not close and the assembly 10 will not raise or lower. Should the distance between the holder and the workpiece change electrode wire 16 will continue to advance and maintain the arc length independently of the holder, however, the electrical characteristics of the arc will change due to the fact the current path or the distance between contact 23 and workpiece 14 or the length of the tip of the electrode 64 extending from head 26 will change thus changing the amperage and the degree of weld metal penetration.

For example, should the space between contact 23 and workpiece 14 diminish the length of tip 64 would be reduced, reducing the current path and electrical resistance offered by tip 64, increasing the amperage. In the present apparatus and process, however, cell 58 would immediately fail to sense light, interrupting the current to control 62 that holds open the relay that causes motor 38 to rotate drive 40 in a direction to raise assembly 10 to where the spacing between contact 23 and workpiece 14 is reestablished and cell 58 is again energized to open the relay energizing the motor whereupon the prescribed length of tip 64 and the prescribed amperage will be reestablished.

Should the space between contact 23 and workpiece 14 become too great, cell 56 would fail to detect light cutting the current that holds the relay open that causes motor 38 to lower assembly 10. Holder 28 then lowers until the preselected distance between contact 23 and workpiece 14 is reestablished or where cell 56 detects point 46a to open the relay that energizes motor 38. By reducing the length of tip 64 the amperage increases to its original setting.

Such positioning of holder 28 is sufficiently rapid and continuous to maintain a stable arc of consistent length that provides a surprisingly uniform weld deposit although the surfaces of the workpieces are relatively uneven.

Figure 4:
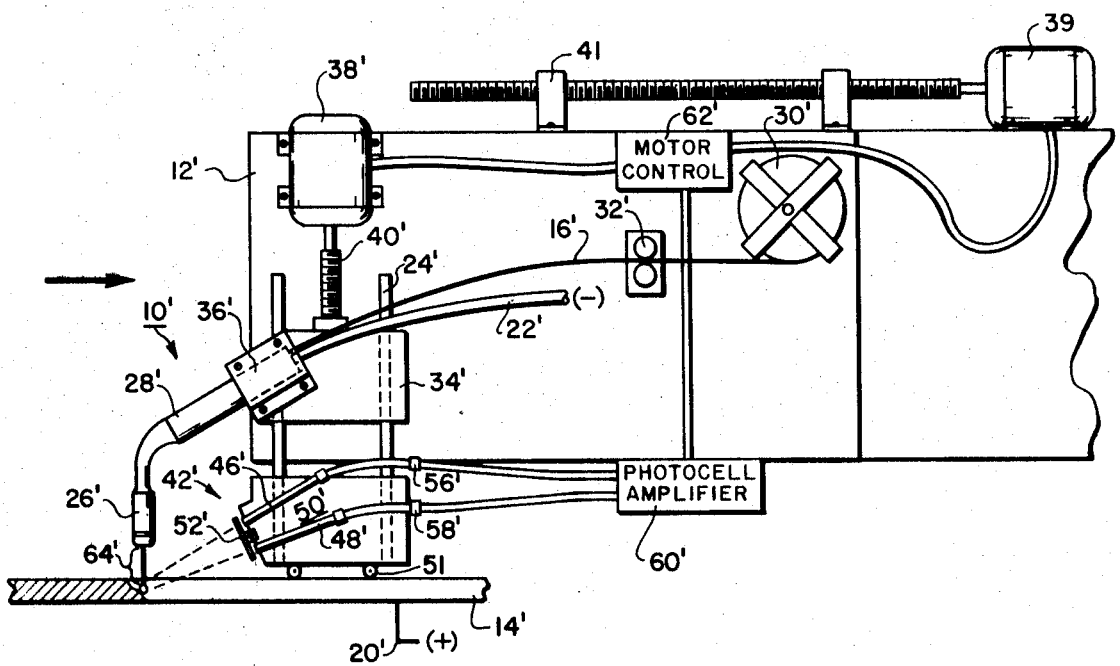
FIG. 4 is a side elevation view of an apparatus constructed in accordance with the present invention for narrow gap welding arc control.
Figure 5:
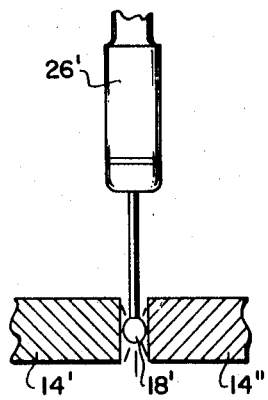
FIG. 5 is an enlarged fragmented front view of the arc of the apparatus of FIG. 4 and immediately surrounding structures.

Turning now to the embodiment of FIGS. 4 and 5 wherein the apparatus of the present invention is disposed to control weld penetration during continuous and automatic "narrow gap welding" between spaced plates. In this type of welding an arc is established between the plates. A consumable wire electrode is continuously fed into a gap between the plates while being advanced horizontally. An electrical potential established between both plates and the electrode effects an essentially elongated flame which causes melting of the adjacent plate surfaces and in combination with the metal of the consumable wire electrode creates a weld. The established arc is generally of less length than the gage of the plates and is prepositioned within the gap by proper control of the parameters of amperage, voltage, electrode feed rate, etc. For example, it is frequently desired to regulate these parameters so that the arc is centrally positioned between the workpiece plates (see FIG. 5).

Irregularities, particularly in gap spacing (i.e., a wider gap at one end than at the other), frequently result in overpenetration (arc too low) or underpenetration (arc too high) in the space between the plates leading to uneven weld deposits and an inferior product.

In the application of the present process and apparatus to "narrow gap welding" we mount the sensor means 42' on a separate carriage 50' which is mounted on wheels 51 to permit horizontal travel with frame member 12' but which is slideably engaged to the frame by guide rods 24' which extend through and slideably engage slots within carriage 50' so that the carriage and sensing means do not move vertically with carriage 34' but are vertically spaced in respect to the gap or workpieces. Otherwise the apparatus of FIGS. 4 and 5 may be substantially identical to that of FIGS. 1 and 3.

Figure 2:
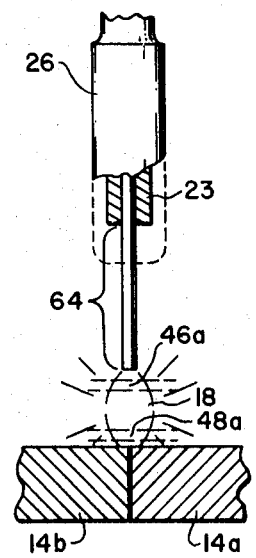
FIG. 2 is an enlarged fragmented front view of the arc of the apparatus of FIG. 1 and immediately surrounding structures.

In operation, however, there are significant differences between the embodiments of FIGS. 4 and 5 and those of FIGS. 1 and 2. Optics 46' and 48' are trained within the gap to the location desired and to observe two spaced points within the desired arc (preferably defining the length of the arc or flame). Once the arc is established consumable wire electrode 16' is, of course, fed into the gap through holder 28' at a rate determined to maintain the arc within the desired limits during horizontal travel in the direction of the arrow. However, where the gap width varies and arc penetration becomes too great (too low in the gap) cell 56' will fail to detect light. In this event the electrical current needed to keep the relay of control 62' open which causes motor 38' to rotate screw 40' in a manner to raise head 28' is cut off. Thus the head is raised until cell 56' again detects light to reestablish the relay opening current. Raising the head lengthens the current flow path by extending the length of tip 64', increasing current resistance, lowering amperage, and decreasing the propensity of the arc to overpenetrate the gap since greater amperage is required to maintain the arc at a lower depth. Where cell 58' fails to detect light there is insufficient arc penetration and the relay closes to cause motor 38' and drive screw 40' to lower head 28' shortening tip 64 to reduce current resistance and to raise the amperage causing the arc 18' to effect greater penetration. Thus, arc 18' is maintained within the length defined by optics 46' and 48'.

In still another embodiment of the present invention, further improved consistency of welding utilizing the apparatus of FIGS. 4 and 5 is effected by synchronizing the vertical positioning of head 28' with increased horizontal speed of the apparatus. This is most easily described in conjunction with FIG. 4 by an illustrative horizontal driving means that is essentially identical to the electrode holder vertically positioning means. The illustrative horizontal driving means consists of a horizontally positioned anchored reversible motor 39 that is disposed to rotate a worm or screw drive 41 that projects through appropriately threaded orifices of frame 12'. Motor 39 may be of a type capable of three speeds—the middle speed being gaged for normal welding involving perfectly spaced plates, a fast speed being slightly greater than normal, and a slow speed being slightly less than normal. Cell 56' in this embodiment may generate two currents—one which maintains a relay open in the motor control which energizes motor 38' to lower holder 10' if closed and one which maintains a relay open which energizes motor 39 to go from normal speed to fast speed when closed. Thus, if there is overpenetration and cell 56' fails to see light not only is holder 28' raised to reduce the amperage to flame 18' but the apparatus decreases its speed in the direction of the arrow so that the arc plays on the weld pool to some extent which tends to reduce overpenetration.

Conversely, failure of cell 58' to view light will cause relays to close that will shift motor 39 into high speed and lower holder 28' causing arc 18' to lead the molten pool and lowering the amperage both of which tend to increase arc penetration.

A still further embodiment of the present invention relates to the electrode drive system. Where there is overpenetration a decreased speed of rollers 32', feeding roll 16' to the arc at a slower rate, will tend to reduce arc penetration whereas an increased weld wire feed rate will tend to increase arc penetration. Thus, relay contacts may be employed in conjunction with cells 56' and 58' in the manner described with the horizontal drive and vertical electrode positioner either in combination with these systems or alone.

Figure 6:
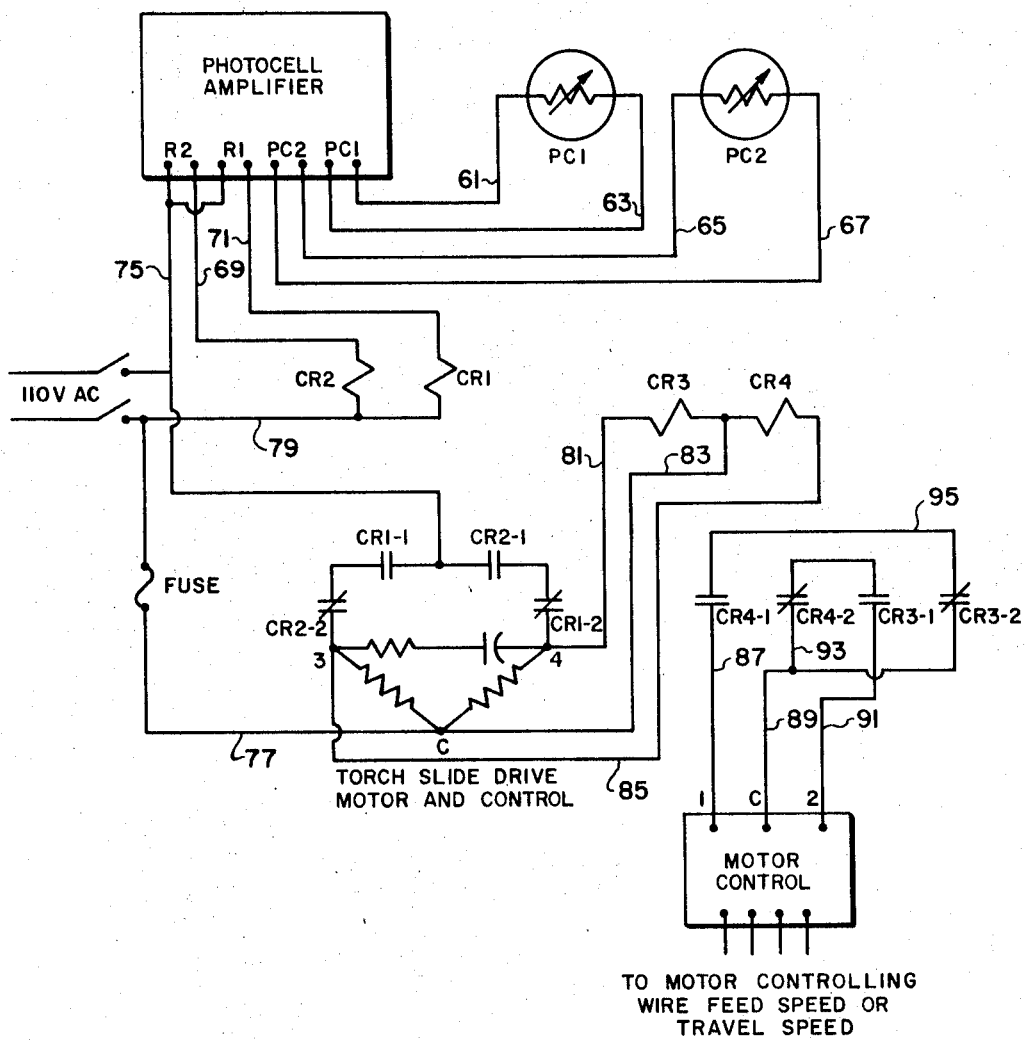
FIG. 6 is an illustrative circuit diagram for controlling the apparatus of FIG. 4.

FIG. 6 of the drawings is a schematic circuit diagram of the arc length control of the apparatus of FIGS. 4 and 5 as modified to include adjustment of horizontal travel speed or electrode wire feed rate.

In this diagram energization of photocells 56' (PC1) and 58' (PC2) keep relay coils CR1 and CR2 energized through leads 61, 63, 65 and 67 to the photocell amplifiers and leads 69 and 71 from the amplifier. Energized coil CR1 maintains contact CR1-1 open and CR1-2 closed while energized coil CR2 maintains contact CR2-1 open and CR2-2 closed. Thus, the torch slide drive and motor control remains deenergized since contacts CR1 and CR2 remain open so long as cells 56' and 58' sense arc light.

If cell 56' fails to detect light coil CR1 is deenergized (due to lack of current in lead 71) closing contact CR1-1 and opening contact CR1-2. Coil CR2, however remains energized through leads 69 and 75 through contacts CR1-1, CR2-2, the torch slide drive motor and control and leads 77 and 79. Consequently the torch slide drive motor and control are energized to raise head 28'.

When cell 56' again detects light, current flow in lead 71 will again create the necessary flux in coil CR1 to open contact CR1-1 and close CR1-2 deenergizing the torch slide drive and control motor.

So long as relay coils CR3 and CR4 are deenergized contacts CR3-1 and CR4-1 remain open and CR3-2 and CR4-2 remain closed so that the motor controlling shifts in the wire feed speed or travel speed remains deenergized. However, where cell 56' fails to detect arc light and contact CR1-1 is closed in the manner described above coil CR4 is energized to render a flux through leads 69, 79, 77 and 83 and lead 75, contacts CR1-1 and CR2-2 and lead 85 to shift the wire or travel speed motor through leads 87 and 89 to decrease the speed of the motor.

In a like manner when cell 58' (PC2) fails to sense light coil CR2 is deenergized since lead 69 fails to carry a current, however coil CR1 remains energized through leads 71 and 75 (via contacts CR2-1 and CR1-2, the slide motor drive, leads 77 and 79). Thus the slide motor is energized to lower holder 28'.

Simultaneously coil CR3 is energized through leads 81 and 83 while current is blocked to coil CR4 by contact CR1-1 so that the wire feed or travel speed motor is shifted to high gear (2) through contact CR3-1 and lead 91 and contact CR4-2 through leads 93 and 89.

The connections 1, C, and 2 of the motor controlling wire feed speed or travel speed lead to a reversible motor that drives a potentiometer contact through which the actual motor is driven. When C is connected to 1 (through contacts CR4-1 and CR3-2) the polarity of the driven reversible motor is such to drive the potentiometer in a direction to reduce the voltage supply to the motor controlling the wire or travel speed. Where C is connected to 2 leads 89 and 91 (through contacts CR3-1 and CR4-2) the polarity of the potentiometer motor drive is reversed to drive the potentiometer contact in a direction to increase the wire feed or travel speed.

It will be obvious to those skilled in the art that either the weld wire feed rate or the horizontal speed may be employed alone to bring the arc 18' back into the preselected penetration position between plates 14' and 14'' or any combination of these systems may be so employed.

It will also be obvious to those skilled in the metal joining art that the above described apparatus may be modified to a considerable extent without deviation from the scope of the invention. For example, sensing means 42 and 42' may be any sensing device capable of detecting arc light within a relatively restricted vertical space. For example, such sensors may be composed of photoelectric cells mounted behind horizontally extending vertical slits disposed to mask all but a very limited vertical area of the arc. Or such cells may be aligned with various optic systems disposed to amplify only preselected areas of the arc.

A significant feature of the method and apparatus of the present invention relates to the fact that the sensing means of the present invention is disposed to observe two spaced vertical points along the arc or along a desired path of the arc rather than determine the intensity of the arc as in prior art systems of this type. By such arc length and position control I am able to effect a rapid response and maintain a uniform weld deposit and structure in the face of the inevitable deviations that are difficult to control with other systems.

In practicing the present invention I used a Linde OM48 side beam carriage and track. The welding torch (or holder) was an Airco welding torch (Model A H $20_\mu$) mounted to a carriage such as carriage 34 which, in turn, was mounted to the side beam carriage on slide rods such as those described in conjunction with FIG. 1. Motor 38 was a reversible slo—sgn motor (Type SS–150P2 mfg. by Superior Electric Motor Co.). The electrode wire drive and welding controls were Airco Wire Feed Drive and Weld Controls (Model No. AH F–N). The constant-voltage welding machine was a Linde SVI 750 (for other satisfactory constant voltage welding machines see the descriptions of U.S. Pat. Nos. 2,532,410 and 2,532,411).

Optics 46 and 48 consisted of structures such as depicted by FIG. 3. The slots 55 and 57 were approximately 0.010 inch × 0.50 inch. Tube 53 was approximately 3 inches long. The fiber optic bundles were American Optical Co. "Light pipes." photocells 56 and 58 were cadmium-selenium Clairex Mfg. Co. No. CL904L.

The electrode wire was 0.035 inch gage mild steel.

When the device was used for penetration control carriage 50 was removed from arm 44 and attached to frame 12 while appropriately directing the sight of optics 46 and 48 into the narrow gap.

Control of the speed of motor 39 (which in actual practice drive frame 12 along a conventional sidearm track) was controlled through a slow-sny reversible motor-driven potentiometer. In other words when cell 56' failed to detect light it caused a relay to close that drove the potentiometer motor rather than motor 39 directly.

PROXIMITY CONTROL

The arc sensor was set up to control the proximity of the weld torch above the surface of a plate (FIGS. 1 and 2). A dial micrometer was attached to the weld torch to indicate movement of the weld torch with respect to the surface of the plate on which the weld beads were deposited. The plate was set up with a rise of one-half inch in 24 inches. Then during deposition of the 24 inch long weld bead the arc sensor had to command the slide drive motor to raise the weld torch one-half inch to maintain the weld torch at a constant height of one-half inch above the surface of the plate. Four weld beads 24 inches long were made to check sensitivity of the arc sensor. The maximum deviation was ±0.015 inch, however the majority of the time it was ±0.010 inch.

PENETRATION CONTROL

The arc sensor was then set up for "narrow gap" welding in the manner of FIGS. 4 and 5. Mild steel plates one-fourth inch thick were positioned for square butt joints with a varying gap width of one-sixteenth to one-eighth inch. Contact-tube-to-work distance and travel speed control (as set forth in conjunction with FIGS. 4 and 5) gave better results than contact-tube-to-work distance alone. The dual control gave better results providing adequate fill in the wide gap areas of the weld joint.

When welding 3/16-inch-thick mild steel plates using a square butt joint design with a varying gap width of 1/16 to Φ-inch glass fiber tape was placed on the root side of the weld joint. Good welds with good root penetration and contour were obtained. Similar results were obtained when the gap width was increased to one-sixteenth inch to three-sixteenth inch.

I claim:

1. A method for controlling the vertical position of an arc during continuous arc welding comprising the steps of:
   a. establishing an arc between an electrode and adjacent workpieces and conducting said arc along a path to effect fusion and welding of said adjacent workpieces;
   b. positioning at least two aligned vertically spaced sensing means to detect preselected spaced areas along the length of said arc during its travel along said path, said sensing means being disposed to individually indicate when they fail to detect the existence of said arc; and
   c. changing at least one arc influencing parameter to bring said arc back into the area of detection of each of said sensing means whenever at least one of said sensing means fails to detect the existence of said arc.

2. The method of claim 1 wherein said influencing parameter consists of changing the electric current amperage supplied to said arc.

3. The method of claim 1 wherein said arc is positioned in a gap between workpieces and said sensors are directed to preselected spaced areas along a path within said gap.

4. The method of claim 3 wherein said electrode is a consumable electrode that is continuously fed to said arc and said arc influencing parameter is at least one parameter selected from the group of current amperage, electrode feed rate, and the speed of welding.

5. Continuous electrode welding apparatus comprising:
   a. means for continuously supplying consumable electrode wire into an elongated weld zone;
   b. a sliding electrical current connection to said wire;
   c. means for driving said wire and sliding connection over said elongated weld zone;
   d. sensing means positioned to sense at least two aligned vertically spaced areas along a preselected welding arc length extending from the consuming end of said wire to said weld zone, said sensing means being further disposed to signal the existence of said arc within each said spaced area; and
   e. means responsive to said sensing means for changing at least one arc influencing parameter to bring said arc back into the area of detection of each of said sensing means whenever at least one of said sensing means fails to detect the existence of said arc.

6. The apparatus of claim 5 wherein said sensing means consists essentially of two individual sensing devices synchronized in movement with said sliding connection, one said device being positioned to sense an area substantially adjacent said weld zone and the other said device being positioned to sense an area substantially adjacent the consuming end of said wire electrode, said means responsive to said sensing means for changing at least one arc-influencing parameter consisting of means disposed to relatively raise said sliding connection when the sensing device positioned to sense an area substantially adjacent said weld zone fails to detect the existence of said arc and to relatively lower said sliding connection when the sensing device positioned to sense an area substantially adjacent said consuming electrode fails to detect the existence of said arc.

7. The apparatus of claim 5 wherein said sensing means consists essentially of two individual sensing devices positioned to sense spaced areas within a weld zone that consists of a gap between adjacent spaced workpieces, said devices being synchronized in movement with said sliding connection in a direction parallel with the elongated weld zone while being spaced relative to said zone, said sliding connection being capable of independent movement normal to said weld zone, one said device being positioned to sense an area that is deeper within said gap than the area sensed by the other sensor, said means responsive to said sensing means for changing at least one arc-influencing parameter consisting of means disposed to lower said sliding contact when the sensing device positioned to sense an area that is deeper within said gap than the area sensed by the other device fails to detect the existence of an arc and being disposed to raise said sliding contact when said other sensing device fails to detect the existence of an arc.

8. The apparatus of claim 7 including means for increasing and decreasing the speed at which said electrode and said sliding contact passes over said weld zone, said means being responsive to increase said speed when the sensing device positioned to sense an area that is deeper within said gap fails to detect the existence of an arc and to decrease said speed when said other sensing device fails to detect the existence of an arc.

9. The apparatus of claim 7 including means for increasing and decreasing the feed rate at which said consumable electrode wire is fed to said weld zone, said means being responsive to increase said feed rate when the sensing device positioned to sense an area that is deeper within said gap fails to detect the existence of an arc and to decrease said feed rate when said other sensing device fails to detect the existence of an arc.

10. The apparatus of claim 7 including means for increasing and decreasing both the speed at which said electrode and sliding contact pass over said weld zone and the speed at which said consumable electrode wire is fed to said weld zone, said means being responsive to increase both said speeds when the sensing device positioned to sense an area that is deeper within said gap fails to detect the existence of an arc and to decrease both said speeds when said other sensing device fails to detect the existence of an arc.

11. The apparatus of claim 5 wherein said sensing means consists essentially of two individual sensing devices positioned to sense spaced areas within a weld zone that consists of a gap between adjacent spaced workpieces, said devices being synchronized in movement with said sliding contact in a direction parallel with the elongated weld zone, and being spaced from said weld zone, one said device being positioned to sense an area that is deeper within said gap than the area sensed by the other sensor, said means responsive to said sensing means for changing at least one arc-influencing parameter consisting of means for increasing and decreasing the speed at which said electrode and sliding contact pass over said weld zone, said means being responsive to increase said speed when the sensing device positioned to sense an area that is deeper within said gap fails to detect the existence of an arc and to decrease said speed when said other sensing device fails to detect the existence of an arc.

12. The apparatus of claim 5 wherein said sensing means consists essentially of two individual sensing devices positioned to sense spaced areas within a weld zone that consists of a gap between adjacent spaced workpieces, said devices being synchronized in movement with said sliding contact in a direction parallel with the elongated weld zone, and being spaced from said weld zone, one said device being positioned to sense an area that is deeper within said gap than the area sensed by the other sensor, said means responsive to said sensing means for changing at least one arc-influencing parameter consisting of means for increasing and decreasing the feed rate at which said consumable electrode wire is fed to said weld zone, said means being responsive to increase said feed rate when the sensing device positioned to sense an area that is deeper within said gap fails to detect the existence of an arc and to decrease said feed rate when said other sensing device fails to detect the existence of an arc.

13. The apparatus of claim 11 including means for increasing and decreasing the feed rate at which said consumable electrode wire is fed to said weld zone, said means being responsive to increase said feed rate when the sensing device positioned to sense an area that is deeper within said gap fails to detect the existence of an arc and to decrease said feed rate when said other sensing device fails to detect the existence of an arc.

14. The apparatus of claim 5 wherein said sliding electrical contact is mounted in an electrode holder and said means for changing at least one arc-influencing parameter consists of relatively raising and lowering said holder.

15. The apparatus of claim 5 wherein said sensing means each consists of an elongated housing provided with opposing masks formed with aligned openings positioned to permit arc light penetration of both said openings from preselected areas of said arc, optic fibers aligned with the opening most remote from said arc leading to a photo electric cell that is disposed to generate an electric current from said arc light to said means for changing at least one arc-influencing parameter to bring said arc back into the area of detection of each of said sensing means whenever at least one of said sensing means fails to detect the existence of said arc, said signal consisting of the interruption of said current.

16. A sensing means for automatically controlling the position of an electric arc comprising:
 a. a pair of spaced sensing means disposed to sense at least two preselected aligned vertically spaced areas along the length of said electric arc; and
 b. control means responsive to said sensing means restoring said arc to within the view of both said sensing means when one of said sensing means fails to sense said arc.

Dedication 3,602,687.—*Robert E. Pollock*, Hilliard, Ohio. ARC LENGTH CONTROL. Patent dated Aug. 31, 1971. Dedication filed Aug. 2, 1974, by the assignee, *The Battelle Development Corporation*.

Hereby dedicates to the People of the United States the entire remaining term of said patent.

[*Official Gazette November 12, 1974.*]